United States Patent [19]
Owen

[11] Patent Number: 6,119,804
[45] Date of Patent: Sep. 19, 2000

[54] HORIZONTALLY POLARIZED SHEAR-WAVE VIBRATOR SEISMIC SOURCE

[76] Inventor: Thomas E. Owen, 10914 Bar X Trail, Helotes, Tex. 78023

[21] Appl. No.: 09/311,001

[22] Filed: May 13, 1999

[51] Int. Cl.[7] ..................................................... G01V 1/02
[52] U.S. Cl. ............................ 181/113; 181/114; 181/121
[58] Field of Search .................................... 181/101, 102, 181/104, 105, 106, 108, 111, 112, 113, 114, 121, 122; 367/25, 912

[56] References Cited

U.S. PATENT DOCUMENTS 5,969,297  10/1999  Ambs ....................................... 181/113

*Primary Examiner*—Khanh Dang
*Attorney, Agent, or Firm*—Jackson Walker L.L.P.

[57] ABSTRACT

A dynamic force transducer for generating horizontally oriented shear forces and motion at a surface of a solid medium. A rigid frame is placed in direct contact with the surface of the solid medium. At least one pair of identical dynamic-force driver units is mounted on the frame to impart horizontally oriented forces to the frame. Symmetrical pairs of compliant springs support the force drivers, but the compliances of each pair of springs may be adjusted or interchanged with other similar springs to introduce different predetermined mechanical resonances. The driver units are excited to produce the horizontally oriented forces with one or more driver units imparting a pushing force and one or more driver units simultaneously imparting a pulling force.

21 Claims, 8 Drawing Sheets

HORIZONTALLY POLARIZED SHEAR-WAVE VIBRATOR SEISMIC SOURCE

BACKGROUND OF INVENTION

The present invention relates to seismic transducers. More particularly, the invention relates to seismic transducers for generating horizontally oriented shear forces and motions.

Shear waves propagate in the rigid matrix component of a granular medium and, therefore, are not influenced in a first-order way by the fluid content in the pores of the medium. For example, shear waves will propagate in essentially the same manner and at the same velocity in a granular material such as soil regardless of whether the medium is saturated with water or not. Compressional waves are directly dependent on the bulk modulus of the fluid in the pores of a granular medium such as soil and, therefore, are strongly influenced in amplitude and propagation velocity by ground water saturation conditions.

In many geological field settings of interest, the ratio of shear wave velocity to compressional wave velocity is in the range of 0.25 to 0.35, indicating that the wavelength of shear waves is less than the wavelength of compressional waves by this same velocity ratio factor. Correspondingly, the source frequency required to produce a shear wave having a given wavelength is reduced by the same velocity ratio factor. For example, in an earth medium having a shear wave velocity of 150 m/s and a compressional wave velocity of 500 m/s, the wavelength associated with a 500 Hz shear wave is $\lambda_s=150/500=0.30$ m (approx. 12 in.) and the wavelength associated with a compressional wave at the same frequency is $\lambda_p=500/500=1.0$ m (approx. 40 in.). Thus, shear waves at 500 Hz have the potential to detect localized cavity targets as small as 15–30 cm (6–12 in.) in diameter whereas compressional waves at 500 Hz have a potential cavity detection threshold size limit of 50–100 cm (20–40 in.). Higher operating frequencies can yield improved resolution and stronger reflected signals from these size targets. However, absorptive attenuation in granular media such as soil increases exponentially with frequency and, hence, attenuation effects and associated propagation distance limitations will be greater for compressional waves than shear waves when the same threshold target size detection and resolution is required.

Seismic shear waves offer potential advantages over compressional waves in shallow geophysical and geotechnical applications because of their lower wave propagation velocity and their transverse particle motion polarization. The lower propagation velocity of shear waves provides an improved ability to detect and resolve reflections from small localized anomalies in the medium. The transverse particle motion of shear waves provides selective reflectivity from planar surfaces either to minimize shear-to-compressional wave conversion at reflecting interfaces as occurs when the particle motion is parallel to the interface or to minimize coherent interference such as associated with surface waves (commonly referred to as 'ground roll') by using horizontally polarized shear waves radiated in the azimuthal direction from the source to the detectors. Another important advantage of shear waves is the fact that shear waves do not propagate efficiently in media that have low or negligible shear modulus such as non-rigid materials (i.e., mud or water). For this reason, shear waves provide strong reflection responses from air-, water-, or mud-filled cavities such as washout cavities or open fractures in earth materials or in structures made of concrete or other engineering materials.

Shear wave vibrators have been developed for relatively deep seismic geophysical surveys where the reflection targets are large-area layer interfaces and geologic faults at typical depths of a few hundred meters to several thousand meters. The shear wave vibrator sources used for these applications are generally large in size and are operated at substantial power levels by hydraulic-pressure-driven force coupling mechanisms to produce shear waves which are generally limited to the frequency range of about 5–200 Hz.

Although the existing shear wave sources are capable of generating predominantly shear stresses and radiated shear waves at the ground coupling point, these sources also generate a noticeable amount of compressional radiation which, in many cases, causes unwanted interference. Further, deep shear wave seismic exploration applications require high-power source signals (shear forces in the range of about 2,000–20,000 lbf) and, therefore, the presently available shear wave vibrator source systems are generally very large and expensive. Thus, the existing technology in seismic shear wave seismic vibrator sources is not suitable for shallow high-resolution applications directed primarily toward shallow resource exploration, subsurface environmental surveys, and indirect sensing and detection of ground geotechnical conditions and anomalies. In comparison with this existing technology, a shear wave seismic source system appropriate for these shallow applications would preferably operate at relatively high frequencies (typically 200–1,600 Hz) in order to resolve relatively small target details and need only be capable of operating at relatively low shear forces (typically 100–500 lbf) to provide useful results at shallow depths and short propagation path lengths.

Therefore, the object of this invention is to create a new seismic shear wave source capable of generating shear waves uncontaminated by residual compressional waves at frequencies typically up to 1,600 Hz and operating at only moderate shear driving forces typically up to 500 lbf A shear wave vibrator source of this type will be appropriate for shallow geophysical and geotechnical applications and will be matched in size, cost, and mobility appropriate for such shallow field surveys.

BRIEF SUMMARY OF THE INVENTION

The shear wave vibrator of the present invention consists of one, two, or more electromechanical force drivers operating either on the force generating principle employing piezoelectric or magnetostriction technology or the force generating principle employing electrodynamic technology acting on a frame having a baseplate rigidly coupled to the ground medium and reacting against an inertial mass. The force driver or drivers are compliantly supported on a frame so as to impart horizontally oriented vibratory dynamic forces to the frame and baseplate and to the ground. By placing the baseplate in a horizontal orientation with its broad side in rigid contact with a flat ground or other appropriate medium, the frame-mounted force driver unit or units impart a horizontal vibratory force to the baseplate. Because of rigid coupling between the frame and the ground, which is uninterrupted during the vibrational operations, a shear force is imparted to the ground.

With the use of appropriate masses and compliant suspension springs in this composite vibration transducer assembly, the vibrator operating frequency range may be adjusted to an upper limit of 1,600 Hz or higher. By arranging the force driver units and reaction masses in a low-profile orientation close to the ground, and arranged with uniform mass distribution on the frame and baseplate, the tendency to produce tilting motions as a result of the force driver action is minimized. Such an arrangement minimizes any vertical components of dynamic force and motions of the baseplate which may cause compressional waves to be generated in the medium.

The horizontal dynamic shear force at the baseplate-ground/medium contact interface radiates horizontally polarized shear waves having particle motions parallel to the motions of the baseplate. The dynamic force driver unit or units are excited by one or more power amplifiers operating in the audio frequency range at a power level appropriate to drive the overall shear wave vibrator system to a total operating force of 500 lbf or higher when coupled to a ground medium. Excitation signals applied to the shear wave vibrator may either be a swept-frequency sinusoidal time function having prescribed predetermined parameters of frequency sweep range, sweep time duration, and amplitude-time dependence; a pulsed swept-frequency sinusoidal time function (commonly termed a 'chirp' signal) having predetermined amplitude, time, and frequency parameters; a gated sinewave pulse having a predetermined frequency, pulse amplitude envelope, and repetition time period (which may either be periodic or randomly timed); or a random noise function having predetermined statistical parameters. The predetermined parameters of these excitation signals govern the amplitude, frequency, and time characteristics of the radiated shear waves.

DETAILED DESCRIPTION OF THE PREFERRED EMBODIMENT

The essential features of the shear wave vibrator of the present invention are: (a) a baseplate and frame having a means for firmly and rigidly coupling the vibrator to the medium in which shear forces and seismic shear waves will be generated; (b) a means by which one, two, or more dynamic force driver units are attached to the frame in a physically symmetrical manner such that their applied forces are efficiently transmitted as horizontally oriented forces to the ground via the baseplate and ground coupling interface; (c) one, two, or more dynamic force driver units, operating either on the piezoelectric force generating principle or on the electrodynamic force generating principle, to mechanically excite horizontally directed forces on the baseplate in the desired shear wave vibrator frequency range; (d) one, two, or more inertial reaction masses suspended on the coupling frame by compliant springs and/or other isolation materials or components, these masses serving as inertial masses against which the force driver units react to apply dynamic forces to the baseplate and ground coupling frame; and (e) frame components constructed integrally with the baseplate to provide accurate and robust support of the reaction masses and compliant springs so as to avoid any tendencies for unwanted vibration modes or tilting motions of the baseplate during vibrational operation.

As a particular consequence of the finite physical size of the shear wave vibrator in the preferred embodiment, the essential components defined above may be considered to be lumped-constant components typically having the features of rigid mass, compliant spring, absorbent damper, and ideal force generation by electrical-to-mechanical transduction. To describe the energy absorbing characteristics of the earth or other medium to which the shear wave vibrator is coupled, this medium may also be represented as a network of effective lumped-constant masses, effective lumped-constant compliances, and effective lumped-constant absorptive dampers all of which interact to characterize vibrational energy storage and dissipation in the medium, including the effects of energy lost from the vibrator system in the form of shear wave radiation. These components comprise a multi-element network of mechanical spring-mass-damper components which exhibits a mechanical transfer function by which the dynamic forces generated by the force driver units are converted to shear forces in the ground underlying the baseplate and coupling frame. The physical configuration and dynamic interactions of these components must be appropriately specified in order to achieve the desired frequency response and transfer of mechanical power from the force drivers to the radiation load in the ground medium.

Figure 1A:
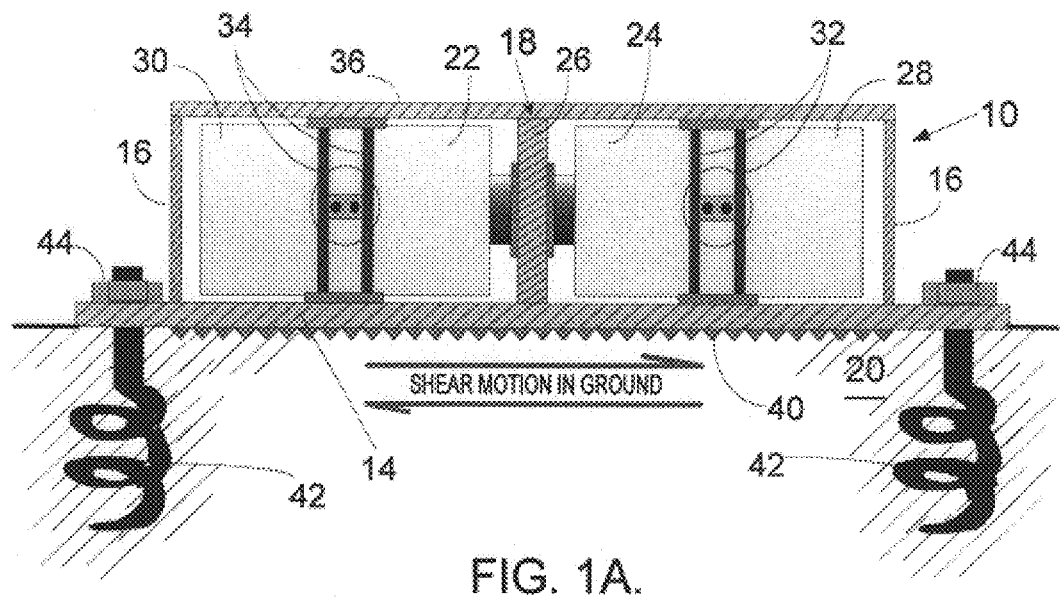
FIG. 1A illustrates a side elevation view of a horizontal shear wave electrodynamic vibrator of the present invention using two force drivers.
Figure 1B:
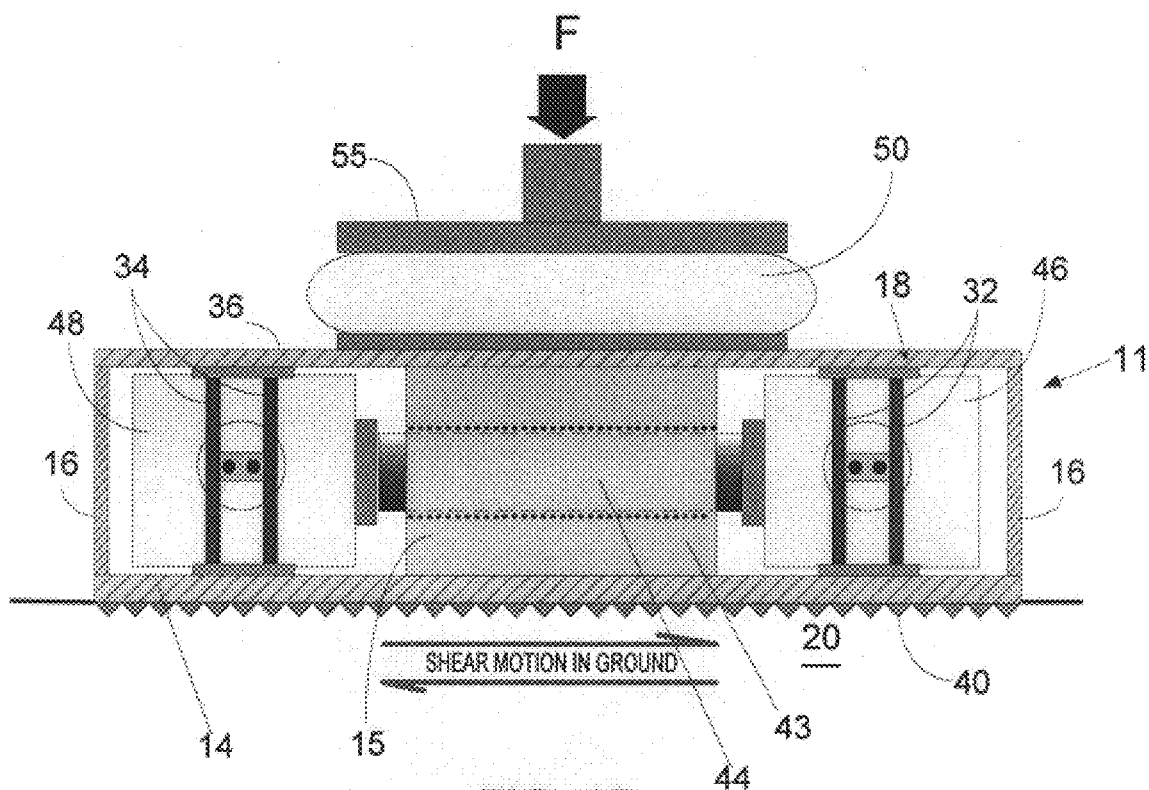
FIG. 1B shows a side elevation view of a horizontal shear wave electrodynamic vibrator of the present invention using a single force driver.

FIGS. 1A and 1B illustrate two physical embodiments 10 and 11 of the shear wave vibrator invention. FIG. 1A shows a two-force-driver configuration by which the operating concepts described above are easily visualized and understood while FIG. 1B shows a single-force-driver configuration whose design is constrained to operate using only one or more electrodynamic force driver unit 15 (i.e., the piezoelectric force driver principle is not appropriately applicable in FIG.1B). The physical components of these configurations are identified by reference numerals in the illustrations and each illustration shows a different means by which the baseplate 14 and coupling frame 18 are attached or otherwise caused to have firm and uninterrupted coupling with the ground medium 20.

As shown in FIG. 1A, two force driver units 22 and 24 are mounted on opposite sides of a vertical plate 26 located at the center of the baseplate 14 and coupling frame 18 so that simultaneous horizontal pushing and pulling forces imparted by the two drivers, respectively, move the unitized vertical plate 26 and baseplate 14 in horizontally oriented dynamic motions. The pushing and pulling forces are achieved as a result of each force transducer mechanism acting appropriately against the vertical plate 26 in reference to respective inertial reaction masses 28 and 30 located on opposite sides of the central vertical plate 26. Since the reaction masses are relatively heavy, they must have strong but compliant supports on the coupling frame 18 to allow the force transducers to operate properly. This support is provided by pairs of two-beam springs 32 and 34 attached at the center of mass on each side of the reaction masses with the ends of these springs 32 and 34 respectively attached to the baseplate 14 and to a top plate 36 which is also rigidly attached to the vertical plate 26 to form the vibrator frame 18.

The two-beam springs as used in this application have the desirable property that their deflections at the center point of attachment to the reaction mass are constrained to remain in the center plane, thereby minimizing any tendency for the masses to tilt or undergo other forms of vertical motion as a result of dynamic vibrator operation. By making the vertical plate 26, the top plate 36, the end plates 16, and the baseplate 14 much stiffer than the compliant support springs 32 and 34, flexural vibration modes in these plates will be suppressed and the lumped-constant spring-mass representation of the vibrator will be governed essentially by the compliance of the two-beam springs 32 and 34 and the mass of the combined baseplate 14 and frame 18. FIG. 1A also shows the baseplate 14 to have angular gripper teeth or ribs, fins, or blades 40 which intrude into the ground medium 20 to make intimate contact with the ground surface so as to give the vibrator a very high coefficient of friction over the baseplate contact area. FIG. 1A also shows one means for physically attaching the baseplate to the ground medium by use of ground screws 42 in the shape of steel 'cork-screw' anchors to which the baseplate 14 is attached by threaded fasteners 44. Other types of such inserted anchors may be used when the baseplate must be attached to a more rigid medium such as a concrete pavement slab.

FIG. 1B illustrates a second vibrator configuration 11 employing only one electrodynamic force driver 15 consisting of a magnet body mass 43 mounted on the baseplate 14, an axisymmetrical movable-coil armature 44, and inertial reaction mass assembly 46 and 48 supported by pairs of two-beam springs 32 and 34. The two-beam springs are attached to the baseplate 14 and to a top plate 36 to maintain the reaction mass 46 and 48 and armature shaft assembly 44 in its centralized axial position during vibrational operation. The baseplate 14 of this vibrator assembly 11 has angular teeth or ribs, fins, or blades 40 which intrude into the ground 20 to make contact with the ground surface to give the vibrator a very high coefficient of friction over the baseplate contact area.

FIG. 1B shows an alternate means for achieving good ground coupling and a large contact pressure of the vibrator on the ground medium. In this method of coupling, an auxiliary load or force coupling mechanism 55 allows the force F to be applied on top of the vibrator 11 through a robust air- or oil-filled bladder 50 to press it down against the ground. The fluid-filled bladder 50 serves as a very low shear stiffness element to effectively isolate the auxiliary force coupling mechanism 55 and associated components from the dynamic mass of the vibrator assembly. With this arrangement, the auxiliary loading force can be made very large to achieve good ground coupling without the mass of the auxiliary force coupling mechanism 55 and the bladder 50 influencing the seismic vibrational characteristics of the vibrator system.

Figure 2A:
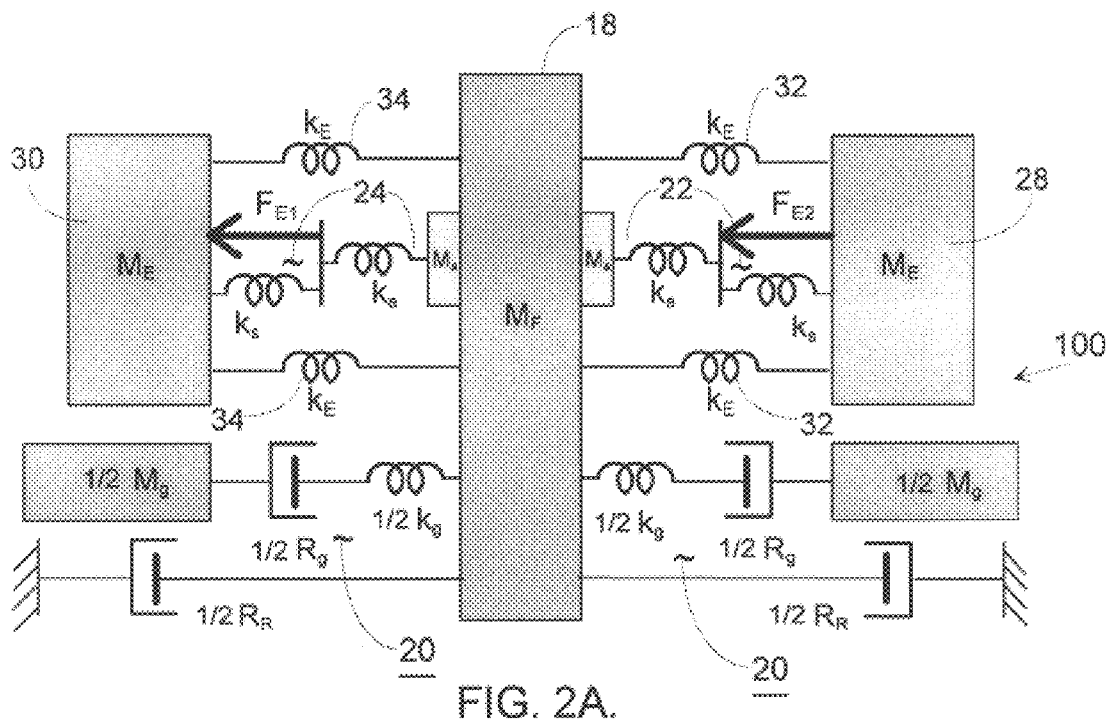
FIG. 2A shows the lumped-constant spring-mass mechanical system model corresponding to the vibrator of FIG. 1A.
Figure 2B:
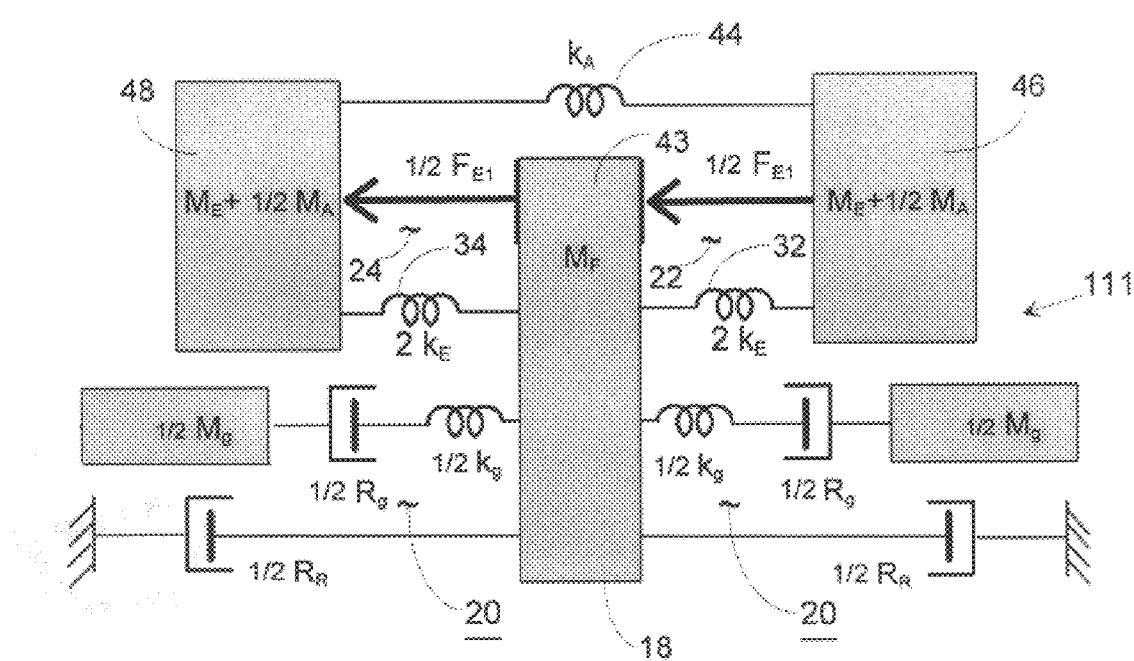
FIG. 2B shows the lumped-constant spring-mass mechanical system model corresponding to the vibrator of FIG. 1B.

FIGS. 2A and 2B, respectively, show lumped-constant spring-mass mechanical system models 100 and 111 corresponding to the vibrator devices depicted in the illustrations of FIGS. 1A and 1B. The springs and masses shown in these illustrations are associated with the physical components comprising the vibrator assemblies as identified by corresponding numerals shown in each of the figures. To achieve horizontal motions at the coupling frame-ground interface, the force drivers 22 and 24 in FIG. 2A are driven with the same excitation waveform but with polarities of signal connection such that their pushing and pulling forces add constructively to produce an effective double-amplitude horizontal shear force on the vibrator frame. Symbolically identified spring $k_a$ and mass $M_a$ shown in FIG. 2A are associated with the movable coil armature and spring $k_s$ is a high-compliance suspension element supporting the movable armature within the magnetic bodies 28 and 30. In FIG. 2A, force driver vectors $F_{E1}$ and $F_{E2}$ are oriented to pull and push on the vibrator frame 18 via the stiff spring $k_a$ representing the movable-coil armature. The force driver vectors $F_{E1}$ and $F_{E2}$ in combination with springs $k_a$ and $k_s$ and mass $M_a$ form the composite force generator mechanisms 22 and 24 in vibrator system 100.

In FIGS. 2A and 2B, the series-connected spring-damper-mass combination, $k_g$, $R_g$, $M_g$, represents the dynamic structure of the ground 20 as a symmetrically coupled two-part lumped-constant mechanical impedance. The energy lost to shear wave radiation is represented by a separate damper element, $R_R$, also shown as part of the dynamic structure of the ground, subject to the motional force and velocity imparted to the ground by the baseplate 14. In FIG. 2B, force vectors $\frac{1}{2}F_{E1}$ act to pull and push the total frame mass represented by the combination of 18 and 43 in FIG. 2B relative to the inertial reaction mass assembly represented by the combination of 44, 46, and 48 in FIG. 2B, forming the force generating mechanisms 22 and 24 of the second embodiment of the vibrator system 111.

Figure 3A:
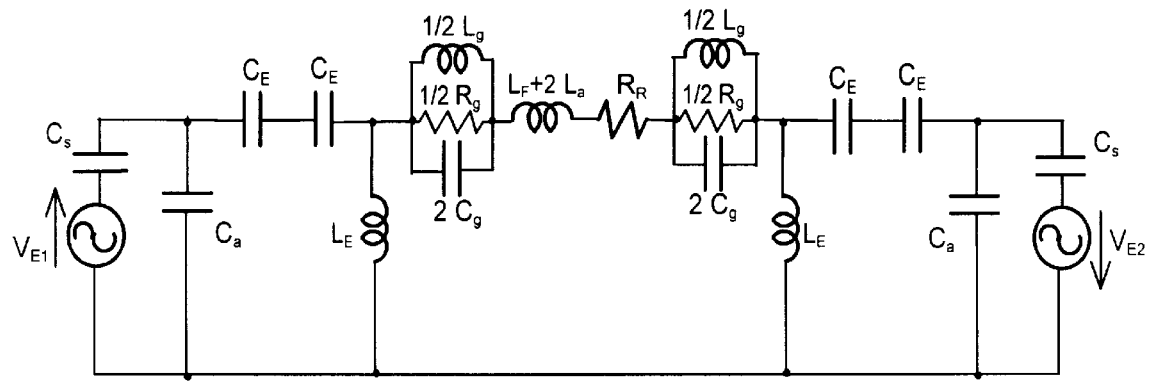
FIG. 3A illustrates the electrical analogy equivalent circuit for the vibrator of FIG. 1A.
Figure 3B:
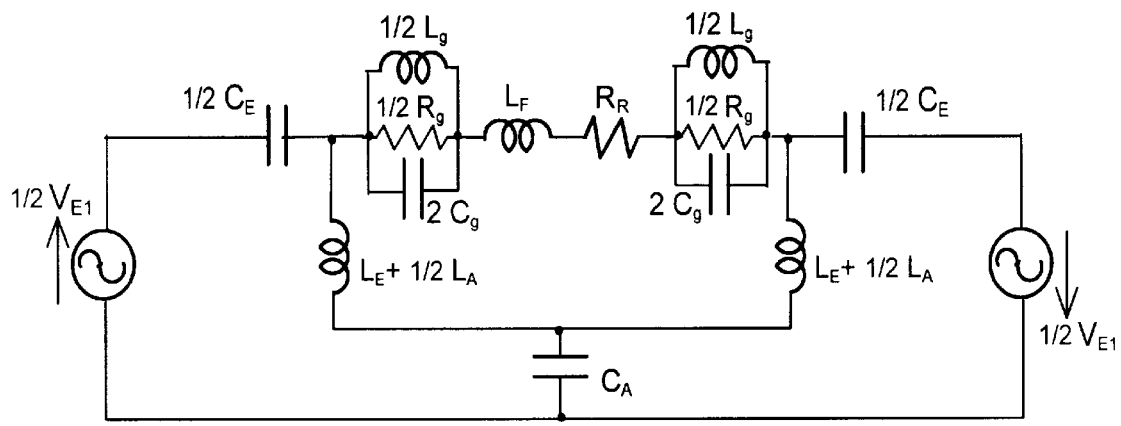
FIG. 3B illustrates the electrical analogy equivalent circuit for the vibrator of FIG. 1B.

FIGS. 3A and 3B show electrical analogy equivalent circuits by which the mechanical models shown in FIGS. 2A and 2B may be represented for convenient analysis of the transfer function from the force driver excitation terminals to the shear wave radiation resistance component of the ground medium. This electrical analogy is based on the equivalence between mechanical force and electrical voltage in the respective mathematical equations describing the dynamic mechanical response and the electrical circuit response. In particular, these equivalences occur when voltage corresponds to force, current corresponds to velocity, inductance corresponds to mass, capacitance corresponds to spring compliance (i.e., to the reciprocal of spring stiffness), and resistance corresponds to vibrator and ground damping losses and to shear wave radiation loss. These equivalence relationships result in associated mechanical components as shown symbolically in FIGS. 2A and 2B and their corresponding electrical component analogs shown in FIGS. 3A and 3B. That is, $V_{E1} = F_{E1}$  $V_{E2} = F_{E2}$  $C_s = 1/k_s$  $C_a = 1/k_a$  $C_E = 1/k_E$  $L_E = M_E$  $L_F = M_F$ $L_a = M_a$  $L_g = M_g$  $C_g = 1/k_g$  $R_g = R_g$  $R_R = R_R$  $L_A = M_A$  $C_A = 1/k_A$ Applying conventional circuit analysis to the electrical analogy circuits in FIGS. 3A and 3B leads to the fact that, if the two mechanical systems are ideally symmetrical in their structure, the compliance branch, $C_A$ in FIG. 3B containing spring stiffness $k_A$ conducts equal and opposite currents and, therefore, this branch may either be short circuited or removed from the circuit because of the balanced current condition. Thus, by replacing $C_A$ by a short circuit, the analog circuit diagram in FIG. 3B is the same as that of FIG. 3A although the values of the branch impedances will not necessarily be the same for the different one- and two-driver unit vibrator configurations because of physical differences in their masses and compliances.

The mutual impedance associated with the analog circuit branches, $L_E$, in FIGS. 3A and 3B, corresponding to the reaction masses in the system, preferably will be made as large as necessary to allow maximum force transfer from the force driver unit or units to the ground medium. A guideline for the size of this reaction mass is that the magnitude of its mechanical reactance should be at least equal to or larger than the magnitude of the mechanical reactance of either the suspension spring, $k_E$, or the mass of the coupling frame, $M_F$, as shown in FIGS. 2A and 2B, which ever is smaller in magnitude at the lowest vibrator operating frequency of interest.

Figure 4:
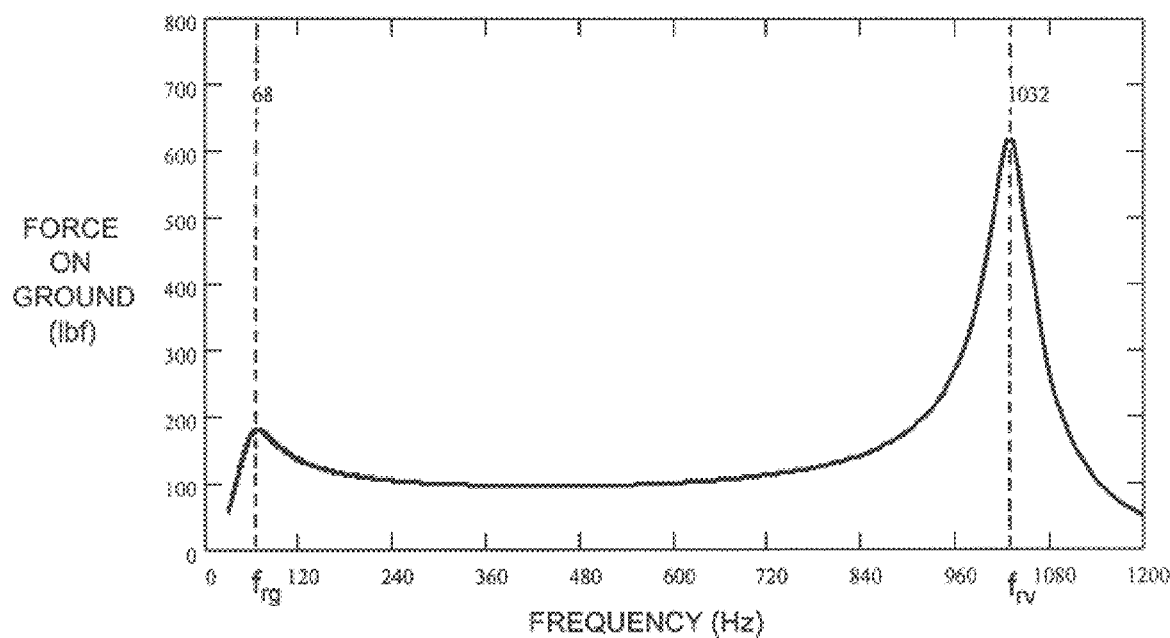
FIG. 4 is a graph of steady-state amplitude vs. frequency response typical of the shear wave vibrators of FIGS. 1A and 1B.

FIG. 4 illustrates the general form of the steady-state force frequency response of vibrator configurations 10 and 11 shown in FIGS. 1A and 1B for a constant-amplitude sinewave excitation signal applied to the two-driver unit input terminals and measured at the radiation resistance representative of either of the vibrator configurations described above. In this figure, the low-frequency resonance peak, $f_{rg}$, is associated with the relatively large effective mass and low stiffness of the localized ground medium underlying the baseplate. The high-frequency resonance peak, $f_{rv}$, is associated primarily with the mass of the coupling frame and the compliant springs linking the frame and the reaction masses together. In practice, the low-frequency resonance will be about 50 Hz, or less, for a natural earth medium and is dependent on the physical properties of the soil material (i.e., the elastic moduli, density, Poisson's ratio, and internal friction loss) and the contact area of the vibrator baseplate. For a concrete slab ground medium, the low-frequency response may be as high as 200 Hz because of the higher values of the elastic properties of the concrete materials.

The high-frequency resonance shown in FIG. 4 may be adjusted by changing the compliance of the suspension springs and/or the mass of the composite coupling frame assembly. Resonances in the range from a few hundred Hertz to 1,600 Hz, or higher, may be attained using appropriate suspension springs. The rising amplitude response versus frequency introduced by this high-frequency resonance is generally desirable and beneficial since it will offset, in part, the dissipative losses that inherently occur in practical ground media and which also increase with frequency.

A further useful feature of the springs associated with the mechanical resonance of the shear wave vibrator is that the compliance value of the springs may be incrementally adjusted at a prescribed predetermined function of time so as to change the mechanical resonance frequency of the vibrator in a corresponding prescribed function of time. This incrementally changeable It mechanical resonance of the vibrator is made controllable in such a manner as to permit the vibrator resonance frequency to track the time-dependent frequency of a continuous sweep-frequency excitation signal applied to the dynamic force driver units. With this arrangement, the vibrator is always operated at its mechanical resonance condition to provide highly efficient generation of seismic shear waves in the ground medium. This advantage in shear wave generation efficiency is especially beneficial for making the overall vibrator system relatively small and compact; a very desirable and useful characteristic for purposes of achieving accurate generation of high-frequency seismic waves in the ground medium.

Figure 5A:
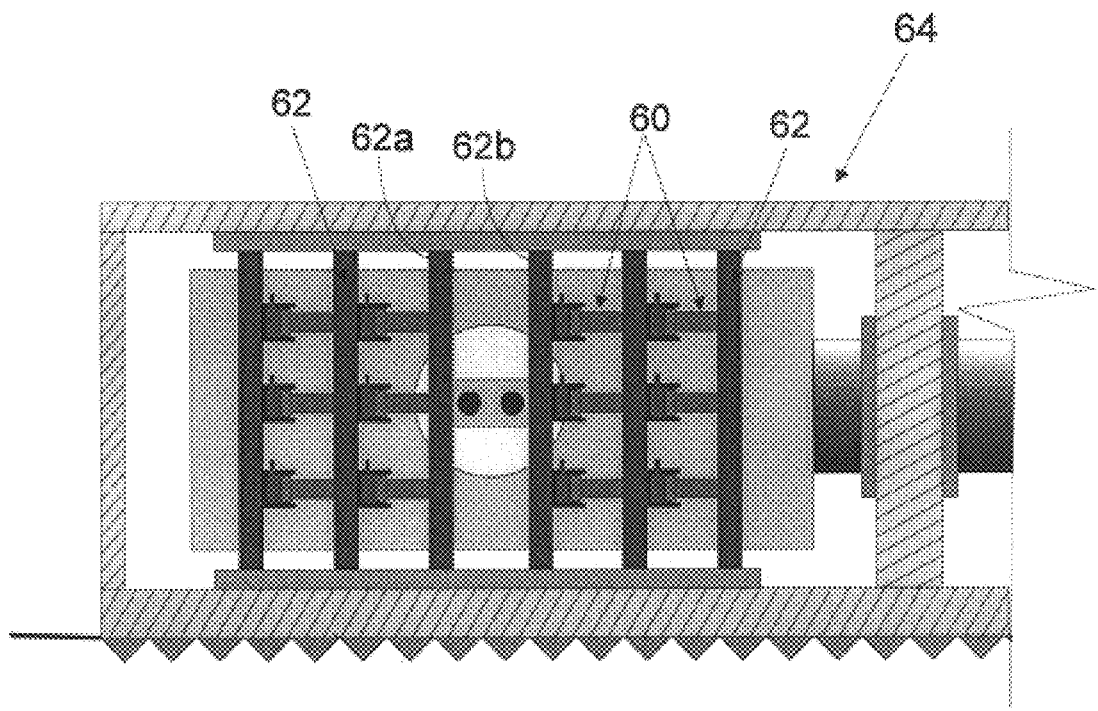
FIG. 5A illustrates a side elevation view of a hydraulically actuated multi-beam spring support of the present invention.
Figure 5B:
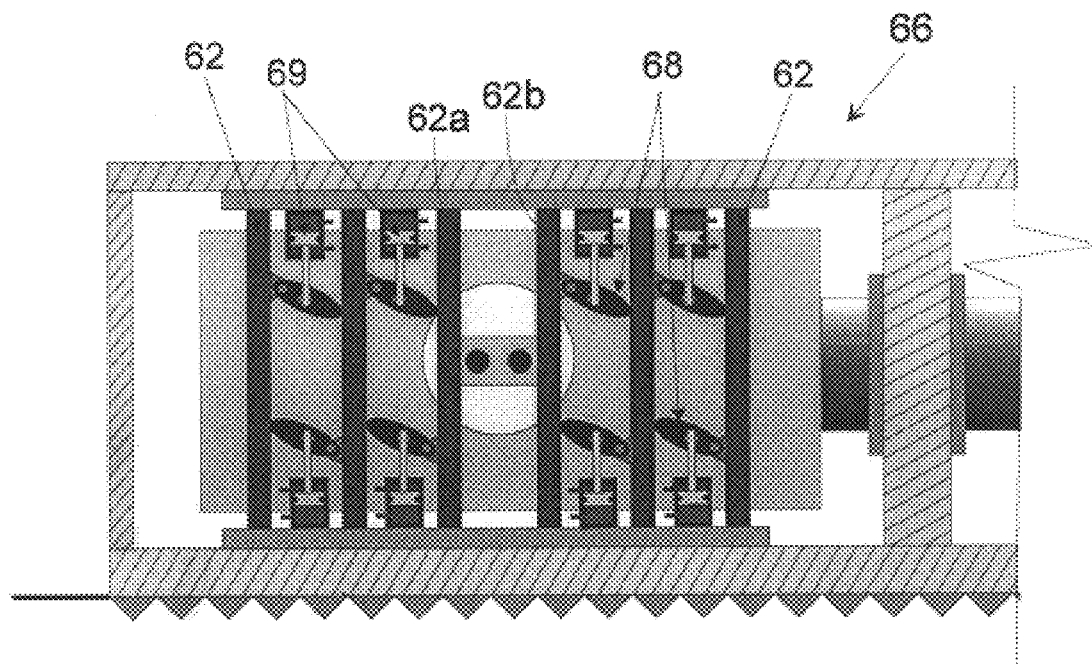
FIG. 5B shows a side elevation view of a mechanically actuated multi-beam spring support of the present invention.

FIGS. 5A and 5B show two methods by which the compliance of a multi-beam spring suspension system supporting the reaction masses may be incrementally adjusted to increase its stiffness so as to increase the mechanical resonance of the vibrator system. In FIG. 5A, a number of small but robust hydraulic cylinders 60 are located between several beam springs 62 and are actuated in an appropriate sequence to link the beam springs together to form a multi-beam spring system 64 which will have an increasing stiffness when the additional beams are coupled together. In general the rate of change of frequency used in frequency sweep seismic operation will be slow enough to allow practical incremental changes to be made in spring compliance versus time using the hydraulic cylinder linkages as shown in FIG. 5A. FIG. 5B shows a similar multi-beam spring system 66 in which the beam springs 62 are linked together by mechanically actuated cams 68 to achieve the same result as described using hydraulic cylinders in FIG. 5A. For fast-action operation, the mechanical cams 68 shown in FIG. 5B are operated by hydraulically actuated shift levers 69 driven at the appropriate time sequence required to achieve the desired changes in overall spring stiffness versus time. The use of mechanical cams 68 offers a positive means of achieving high rigidity in the incrementally added linkages which combine the beam springs 62 in parallel and, therefore, this method, possibly also in combination with hydraulic linkages as shown in FIG. 5A, will aid in obtaining a wide range of adjustment in spring suspension stiffness.

In reference to FIGS. 5A and 5B, beam springs nearest the center 62a and 62b are permanently attached to the reaction mass. These springs have relatively low stiffness (relatively large compliance) so as to provide the lowest mechanical resonance frequency of the system. These first springs 62a and 62b are sequentially stiffened by rigidizing, by application of hydraulic pressure, a plurality of hydraulic cylinders whose physical linkages bring additional beam springs into action to introduce incremental degrees of stiffness in parallel with the first springs. The incremental increases in stiffness cause the mechanical resonance of the vibrator system to increase by an amount approximately proportional to the square root of the total cumulative stiffness of the spring support system.

The incremental changes of this multi-beam spring support system are dependent on the number and stiffness of each beam spring element activated into the suspension, the number of hydraulic cylinders that are used to link the beam springs together, the hydraulic pressures applied to the cylinders and the effective rigidity achieved in each cylinder, and the order sequence in which the hydraulic cylinders are activated. The multi-beam suspension system 64 shown in FIG. 5A illustrates an example having six beam springs and twelve hydraulic cylinder linkages. This configuration can introduce up to twelve incremental changes in spring stiffness when the cylinders are stepped from minimum linkage to maximum rigidity. For example, These twelve increments can by designed to change the mechanical resonance of the vibrator system at three steps per frequency octave, thereby allowing the incremental adjustments in resonance to cover the three-octave frequency range of 200 Hz to 1,600 Hz in twelve steps. To achieve this total range of resonance adjustment, the stiffness of the spring suspension system will require a change from the lowest value of stiffness to sixty-four times that value of stiffness as a result of adding the sequence of supplemental beam springs. Similar design considerations and operational adjustments apply to the mechanical cam-adjustable spring system shown in FIG. 5B.

In adjusting the spring suspension stiffness shown in FIG. 5A using the plurality of hydraulic cylinders described above, the spring stiffness versus time may be made to change continuously versus time instead of in incremental steps versus time by incorporating certain mechanical and hydraulic compliance-adjusting features associated with the hydraulic cylinders. Specifically, the elastic bulk modulus of the hydraulic fluid in each cylinder volume and the mechanical compliances of the hydraulic fluid lines and other components which interconnect the plurality of hydraulic cylinders govern the stiffness of the spring suspension system. Each of the hydraulic cylinders achieves its maximum stiffness (rigidity) when the valve used to change its rigidity is located close to the fluid inlet to the cylinder and is operated to be completely closed. However, by closing this valve slowly to cause an increasing partial closure versus time, the rigidity of the cylinder can be made to change gradually and continuously versus time. The amount and rate of spring suspension stiffness control achieved by this method of valve closure control may be adjusted by connecting a fluid accumulator (a closed-end branch or volume chamber in which the fluid can enter) containing a partial volume of air or other compressible gas and adjusting the rate of closure of the valve (or valves) linking the accumulator with the hydraulic cylinder.

Firm and uninterrupted coupling of the vibrator unit to the ground is essential for achieving efficient shear wave generation and radiation. This coupling may be provided in several ways depending on the magnitude of the force required to be imparted to the ground medium: (a) with a toothed, spiked, ribbed, or finned baseplate bottom surface placed in contact with the ground and held in intimate pressure contact with the ground by the weight of the vibrator unit; (b) by increasing the pressure on the baseplate contact area by applying additional weight on top of the vibrator frame in a manner that does not increase the inertial mass of the coupling frame (for example, by coupling the additional force through an air-inflated bladder located on top of the frame); (c) by means of anchor bolts or screws inserted into the ground by which the baseplate of the vibrator is securely bolted to the ground medium; (d) the use of a temporary bonding agent or adhesive between the baseplate and the medium which, by its intentional rigidity when cured, serves as an efficient coupling interface. Other coupling methods may also be practical and effective depending upon the material comprising the medium.

Figure 6A:
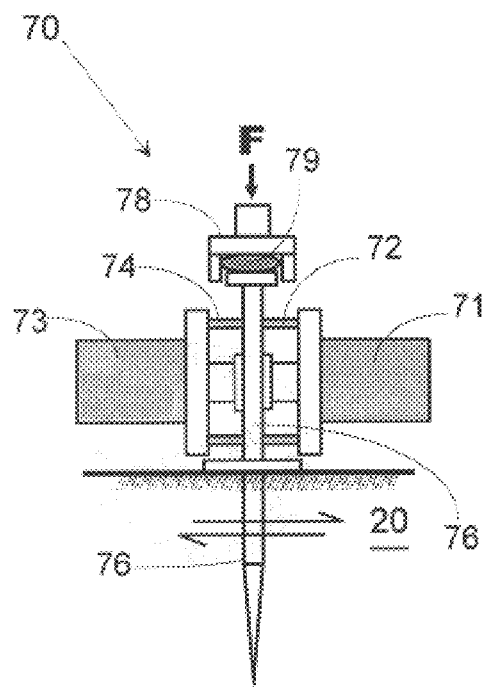
FIG. 6A shows a side elevation view of a horizontal shear wave electrodynamic vibrator employing a ground-intruding blade to provide positive ground coupling in the present invention.
Figure 6B:
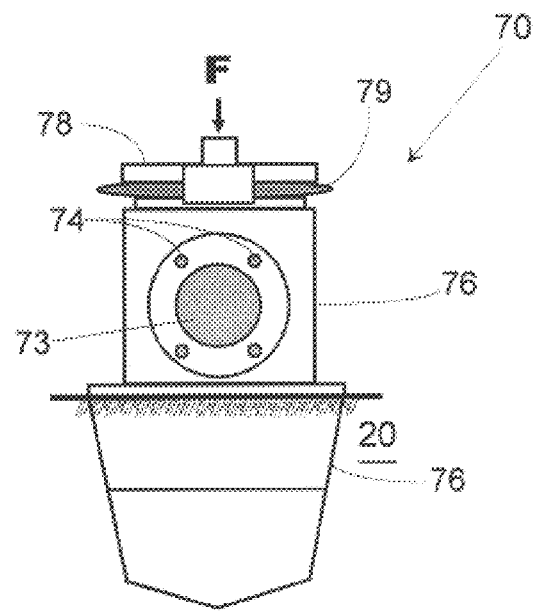
FIG. 6B shows an end view of the vibrator of FIG. 6A to illustrate the general shape and area of the ground-coupling blade.

FIGS. 6A and 6B show an electrodynamic vibrator embodiment 70 having a simplified frame for generating horizontally polarized shear waves in a ground medium 20 into which a coupling blade of fin 76 can be inserted. In this embodiment, for example, the ground-coupling blade 76 intrudes substantially into a medium 20, such as soil, so as to provide a firm and reliable contact for transferring vibrational forces to the ground. The relatively large surface area of the ground-coupling blade 76 provides good dynamic contact between the electrodynamic exciters 71 and 73 and the ground medium 20. FIG. 6A shows two electrodynamic exciters 71 and 73 attached by means of a multiplicity of compliant bar springs 72 and 74 to opposite sides of the above-ground section of the ground-coupling plate 76. The mechanical spring-mass dynamic model and associated electrical analog circuit representation of this embodiment are identical to those shown in FIGS. 2A and 3A, respectively.

The lower section of the ground coupling plate 76 is pushed into the ground by the force symbolized by F in FIGS. 6A and 6B acting on the top edge of the plate 76 through a force coupling mechanism 78. After inserting the ground coupling blade 76 into the ground, the force F applied at the top of the plate 78 may be left in place to provide additional stability and coupling effectiveness between the plate 76 and the ground 20. In this case, an air-filled bladder 79 is installed between the force-coupling mechanism 78 and the top edge of the ground-coupling blade 76. The purpose of this air bladder 79 is to provide mechanical isolation between the mass of the loading force mechanism 78 and the ground-coupling plate 76 and other parts of the vibrator system 70. Transverse-oriented shear vibration motions of the ground-coupling blade are symbolized by the shear-motion arrows indicated in FIG. 6A. A particular advantage of the simplified frame embodiment shown in FIGS. 6A and 6B is that this frame incorporates the minimum structure and mass necessary for coupling the force drivers 71 and 73 with the ground. Reducing the frame mass in this embodiment (and in other similar embodiments employing ground-coupling frames) provides a direct increase in the vibrational energy transferred into the ground by the vibrator.

The vibrator units described in the foregoing paragraphs employ either one or two force driver units and allow only one adjustable mechanical resonance to occur. Additional force driver units can be added to the coupling frame together with separate suspension springs and reaction masses so as to introduce additional mechanical resonances in the overall vibrator system. With this arrangement, the vibrator may be stagger tuned to increase the magnitude of the force generated and to distribute the generated force across the frequency range of vibrator operation for various purposes, including boosting the higher frequency range to compensate, in part, for anelastic absorption in the ground medium.

Figure 7A:
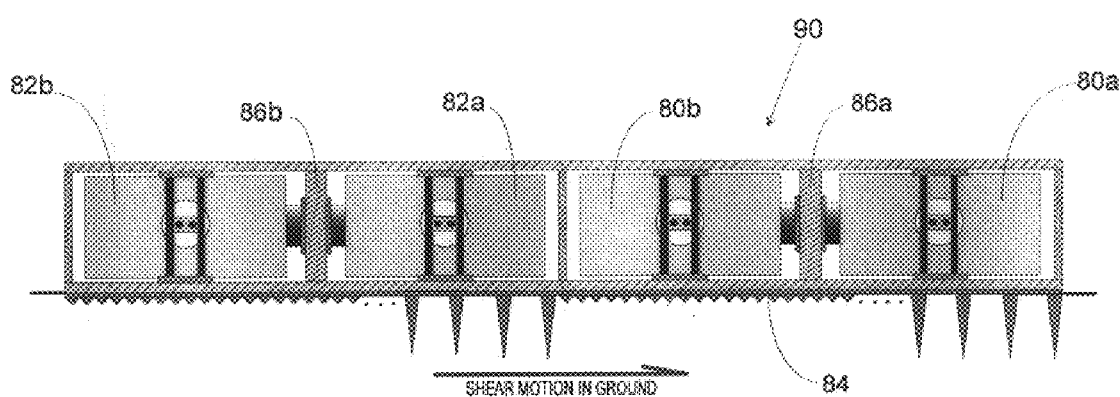
FIG. 7A shows a side elevation view of a four-driver linear-array embodiment of the present invention.
Figure 7B:
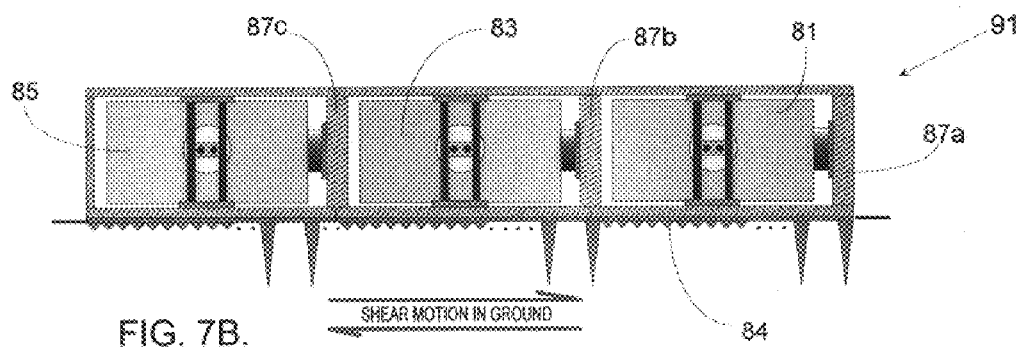
FIG. 7B shows a side elevation view of a three-driver linear-array embodiment of the present invention.
Figure 8A:
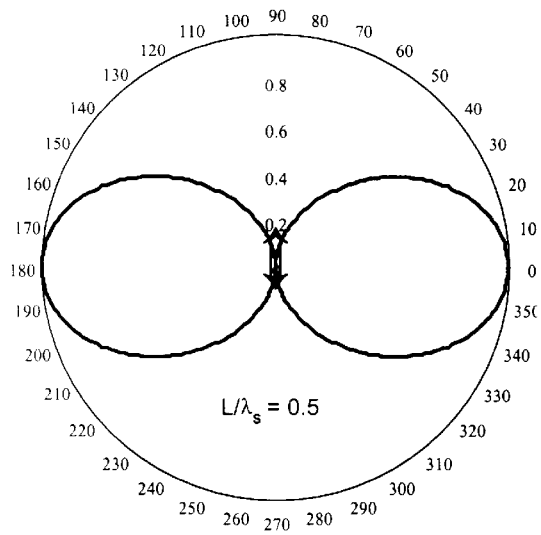
FIGS. 8A through 8D show typical shear wave radiation directivity patterns vs. frequency for a linear-array embodiment of the present invention.
Figure 8B:
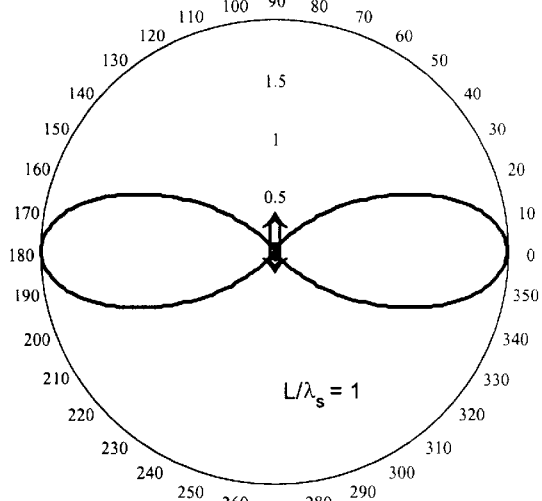
Figure 8C:
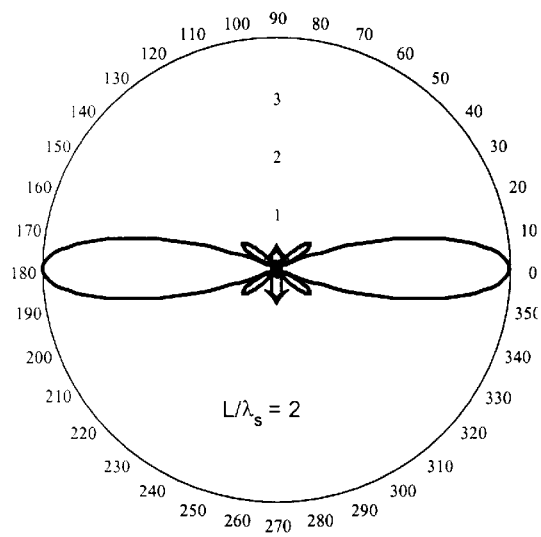
Figure 8D:
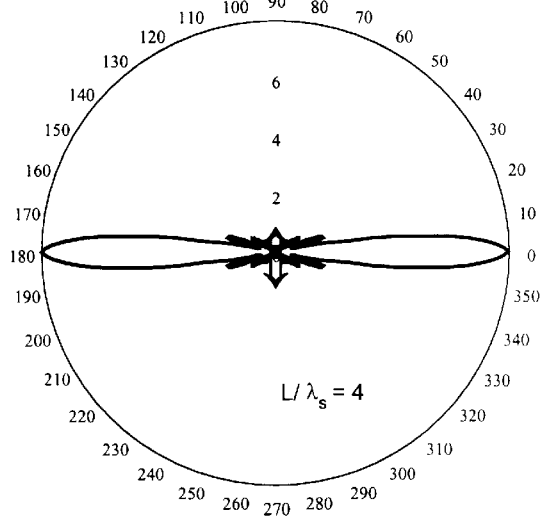

FIGS. 7A and 7B show electrodynamic vibrator embodiments 90 and 91 in which two or more horizontal vibrator units are mounted in a linear array on a single continuous elongated base plate 84 for the purpose of generating horizontally polarized shear waves in the ground 20. In the embodiment 90 shown in FIG. 7A, when the two spring-suspended pairs of force drivers 80*a*, 80*b*, 82*a*, 82*b* are excited to impart push-pull vibratory force on the vertical plates 86*a* and 86*b* the common baseplate 84 moves as a rigid coupling interface in contact with the ground to form a continuous line-source shear wave radiator. For an array consisting of N identical force drivers, the forces generated by each driver add together to produce a total force of N times that of a single driver distributed along the length of the baseplate 84. The base plate 84 of this array and, in particular, the length of the base plate 84 is commonly referred to as the line-source 'aperture'. Similarly, the three-driver embodiment 91 shown in FIG. 7B operates to impart the sum of the three forces generated by force drivers 81, 83, 85 to the baseplate 84 to produce line-source shear wave radiation into the ground medium 20.

Line-source shear wave radiators exhibit a directional radiation pattern in an angular zone generally perpendicular to the aperture. The shear wave radiation beamwidth and angular radiation pattern is dependent on the frequency of operation of the vibrator and the velocity of shear waves in the ground. In particular, when the line-source vibrator is coupled to a homogeneous half-space medium, the shear wave amplitude at any radial distance, R, from the center of the line-source aperture of the radiator normalized by the maximum radiated amplitude (in the plane perpendicular to the aperture axis) at a reference distance, $R_o$, is expressed by $$\frac{A(R_p, \theta_p)}{A(R_o, 0)} = \frac{\int_{-\frac{L}{2}}^{\frac{L}{2}} \frac{R_o \cos\theta_p e^{-j\frac{\omega}{v_s}R(R_p,\theta_p,x)}}{R(R_p, \theta_p, x)} dx}{\int_{-\frac{L}{2}}^{\frac{L}{2}} \frac{R_o e^{-j\frac{\omega}{v}R(R_o,0,x)}}{R(R_o, 0, x)} dx} \quad (1)$$

where:

$$R(R_p, \theta_p, x) = \sqrt{R_p^2 + x^2 - 2R_p x \sin\theta_p}$$

= radial distance from a unit incremental shear wave radiation element, $\cos\theta_p dx$, to field point $P(R_p, \theta_p)$;

$R_p$=radical distance from center of vibrator aperture to field point $P(R_p, \theta_p)$;

$\theta_p$=angle between perpendicular bisecting plane through center of vibrator aperture and field point $P(R_p, \theta_p)$;

x=distance along vibrator aperture wiht respect to origin at center of aperture;

L=total length of vibrator aperture;

$R_o$=a defined radical distance at which the radiation pattern is normalized (typ. $R_o$=1 m);

ω=angular frequency;

$v_s$=shear wave velocity in ground.

This radiation pattern expression may be readily evaluated numerically to give the radiated shear wave amplitude at any point $(R_p \geq R_o, \theta_p)$ relative to the center of the vibrator.

FIGS. 8A through 8D show calculated normalized shear wave radiation patterns for aperture lengths expressed in wavelengths of $L/\lambda_s$=0.5, 1, 2, and 4. As noted from these patterns, the radiated shear wave energy becomes very directional for aperture dimensions which are large relative to the wavelength, $\lambda_s$. These patterns are figures of revolution about the aperture axis (x-axis) in the ground half-space. Such directional seismic radiation afforded by this line-source vibrator is advantageous as a means of confining the radiated energy only in the direction in which seismic shear wave reflections and refraction measurements are of interest. Also, as shown by FIGS. 8A through 8D, as the directivity of the line-source array increases with frequency the amplitude of the radiated shear wave source signal in the main beam of the pattern also increases. This gain in amplitude, commonly referred to as the directivity factor, has the advantage of compensating, in part, for the absorptive propagation losses in the transmitted seismic signals which also increase with frequency. The greatest benefit provided by this directionality of the shear wave line-source radiator is in seismic surveys performed in urban environments where man-made structures such as surface and/or underground foundations or other objects located lateral to the survey line of interest may cause unwanted interference when surveyed using a wide-angle seismic source.

The mechanical forces generated by the force drivers may be referred to the electrical terminals of the exciter units by means of mechanical-to-electrical conversion factors which are determined by the specific transduction principles of either the piezoelectric or electrodynamic driver units. In the case of piezoelectric force transduction, the force generated by a thickness-polarized multi-element stack of piezoceramic plates or disks consisting of N elements assembled in a prestressed 'sandwich' transducer is $$F_p = N \cdot \left(\frac{Y_{33} \cdot A_3}{t_3}\right) \cdot d_{33} \cdot V_3 \quad (2)$$

where:

$F_p$=piezoelectric force driver output force(Newton);

N=number of piezo electric plates in stack;

$Y_{33}$=Young's modulus of piezoceramic material (Pa);

$A_3$=active area of piezoceramic plate or disk($m^2$);

$t_3$=thickness of piezoelectric plate or disk (m);

$d_{33}$=piezoelectric force constant of thickness-polarized piezoceramic material (m/V);

$V_3$=electrical excitation voltage applied to the piezoceramic elements (volts).

In the case of an electrodynamic force driver, the force generated by a current flowing through the exciter coil oriented axisymmetrically in a radially directed static magnetic field is $$F_{ED} = B_o \cdot N \cdot (\pi \cdot d_A) \cdot I_{ED} \quad (3)$$

where:

$F_{ED}$=electrodynamic exciter output force (Newton);

$B_o$=static magnetic field intensity at moving coil armature (Weber/$m^2$);

$\pi \cdot d_a$=average length of one turn of coil on exciter armature (m);

N=number of turns in coil on exciter armature;

$I_{ED}$=electrical excitation current flowing in exciter coil (amp).

These force transduction relationships may be considered to be electrical-to-mechanical transformation factors by which the mechanical dynamic force is directly proportional to the applied excitation voltage or current for piezoelectric or electrodynamic transducers, respectively. The coefficients of proportionality are constants, expressed either in Newtons per volt or Newtons per ampere, respectively, and are dependent upon the geometry and physical properties of the materials comprising the transducers. The electrical-to-mechanical equivalent circuit analogies described earlier may be extended to include the above transformation factors to determine the overall vibrator frequency response and the electrical-to-mechanical power conversion efficiency from the electrical input terminals to the mechanical load components. In particular, these overall equivalent circuits may be used to predict the mechanical force delivered to the shear wave radiation resistance component of the system as produced by a prescribed electrical input excitation waveform as well as the associated forces and stresses developed on each of the various internal mechanical components comprising the structure of the vibrator.

Figure 9A:
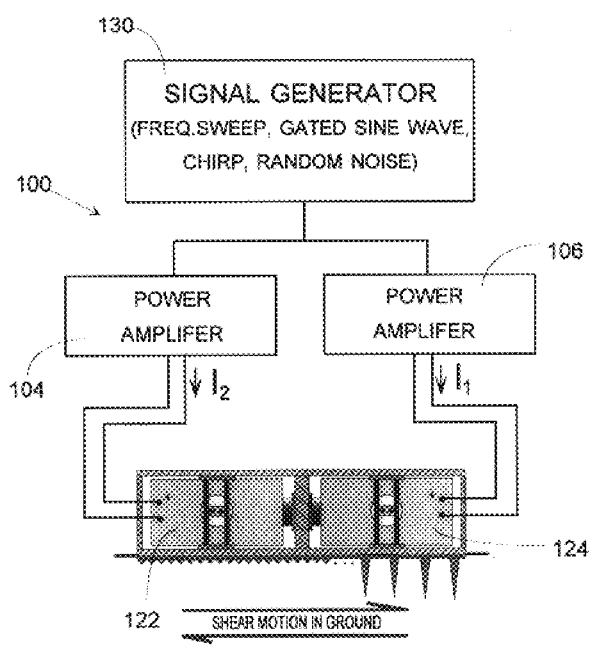
FIGS. 9A and 9B show block diagrams of the horizontal shear wave vibrator system illustrating two different methods of power amplifier connection.
Figure 9B:
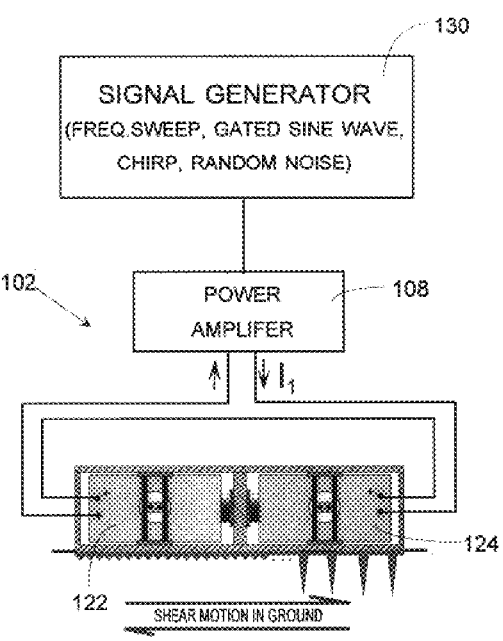

FIGS. 9A and 9B show block diagrams of horizontally polarized shear wave vibrator systems 100 and 102 employing one pair of electrodynamic force driver units 122 and 124. The excitation signal generator 130 in these figures may consist of either a single multi-function unit or several separate modules capable of generating the desired frequency sweep signals, gated sine wave pulses, chirp signals, or random noise signals used to excite the seismic shear wave vibrator source. As shown in FIG. 9A, the excitation signal is amplified by two separate power amplifiers 104 and 106 capable of delivering the electrical driving power needed to excite each of the force driver units 122 and 124. This arrangement provides the capability to separately adjust the excitation power delivered to each force driver. In FIG. 9B, the force drivers 122 and 124 are shown to be connected in series and are driven from one common power amplifier 100. With this arrangement, the two electrodynamic force drivers receive the same excitation current. Similarly, the two force drivers 122 and 124 shown in FIG. 9B could be connected in parallel and driven from one common power amplifier in which case they would receive the same excitation voltage. The system connections illustrated in FIGS. 9A and 9B can be expanded to accommodate vibrators having more than two force drivers and may utilize a multiplicity of power amplifiers to gain the same flexibilities and advantages described above.

The physical components of the shear wave seismic vibrators described in the preceding paragraphs are important elements of the invention disclosed herein. Descriptions and characterizations are outlined below to explain the essential components required to construct practical embodiments of the vibrators. These explanations refer to preferred choices of materials and, where needed to be fully explanatory, the reasons for these choices are stated. Statement of the particular preferences cited below does not preclude the possible use of alternative materials or devices of similar or equivalent properties or physical characteristics in appropriate parts of the invention as may be required to achieve preferential modes of operation or for generation of shear waves in certain specific solid media. Several alternative methods and preferences are mentioned in this regard.

Ground Coupling Frame:

The ground coupling frame is preferably made of aluminum to achieve minimum mass with adequate strength and rigidity for transferring the vibrator driving forces to the ground medium;

Frame Baseplate:

The baseplate is preferably made of tempered aluminum with either machined gripper teeth, attached spikes, or attached fins for the purpose of gripping or penetrating into the ground medium to provide a high coefficient of friction at the ground contact surface interface;

Compliant Support Springs:

The springs used to support the reaction masses are preferably made of a high-strength fatigue-resistant material such as stainless steel or maraging steel for high strength and durable elastic stiffness and the capability of withstanding high-stress cyclic dynamic vibrations with long useful life. These spring components are essential in determining the mechanical resonance of the vibrator and are of a design that may be adjusted or otherwise interchanged with similar springs having a different compliance value to accommodate making changes in the vibrator resonances when required;

Force Driver Units:

The force driver units embodied in the vibrator system may be either piezoelectric or electrodynamic in form:

(1) Piezoelectric Force Driver: A custom-designed assembly of high-force-constant piezoceramic material such as lead zirconate titanate. In particular, the piezoceramic transducer devices are constructed as prestressed multi-element stack assemblies of thickness-polarized plates or disks to achieve efficient vibrator driver operation using practical levels of applied excitation voltage. The piezoelectric force driver units deliver forces to the vibrator frame by acting against reaction masses. The reaction masses are preferably made of high-density corrosion-resistant material such as stainless steel to achieve high rigidity and compact mass. The size and shape of the reaction mass components is determined by the inertial mass needed to achieve efficient force transfer to the ground medium. The prestress rods used to hold the multi-element piezoceramic plates in compression when subjected to large vibrational stresses may also serve as the compliant spring supports for these reaction masses. Additional support springs may also be integrated as separate parts of the vibrator unit.

(2) Magnetostrictive Force Driver: As an alternative form of force driver to the one using piezoelectric transduction, a custom-designed driver unit utilizing a magnetostrictive material such as the rare earth material known as Terfenol D or other equivalent materials may be employed. For this alternative force driver, although the force generating mechanism is based on the mechanical reaction of the magnetostrictive material to a magnetic field produced by an electrical current, in comparison with mechanical reactions of piezoelectric materials to electric fields, the physical assembly of components required to construct the vibrator will be essentially the same for either type of force driver mechanism.

(3) Electrodynamic Force Driver: A permanent magnet electrodynamic vibrator device having a robust movable-coil armature which can be attached to the vibrator frame to impart excitation driving forces to the frame. The permanent magnet body of the electrodynamic driver, which is generally a component of considerable mass, may also serve as one of the spring-supported reaction masses described as part of the vibrator when used in certain design configurations. In other design configurations which employ one or more electrodynamic force driver with a unitized reaction mass component, the permanent magnet body of the driver unit will comprise a rigidly attached part of the vibrator frame. In designs of this latter type, the permanent magnet body of the driver and its movable coil armature must be designed to allow separate reaction masses to be attached to each end of a robust armature shaft which also serves as part of the unitized reaction mass assembly extending through and beyond the ends of the magnet body.

Although the invention has been described with reference to a specific embodiment, this description is not meant to be construes in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A dynamic force transducer for generating horizontally oriented shear forces and motions at a surface of a solid medium for purposes of producing dynamic shear stresses and radiating associated horizontally polarized shear waves in said solid medium, comprising:

a rigid coupling frame for direct contact with said surface of said solid medium, said coupling frame being in uninterrupted contact with said solid medium during vibrational operation of said dynamic force transducer;

at least one pair of identical dynamic-force driver units mounted on said coupling frame to impart horizontally oriented dynamic forces having prescribed amplitude and time dependence to said coupling frame, said prescribed forces transferrable to said solid medium;

at least one pair of identical compliant springs supporting each said pair of identical dynamic force driver units mounted on said coupling frame, compliances of each said pair of springs introducing different predetermined mechanical resonances when acting in combination with the masses of said supported pairs of identical driver units and said coupling frame when excitation energy is applied to said driver units;

a means for exciting said dynamic force driver units in a manner to produce horizontally oriented forces on said coupling frame whereby one of said paired driver units imparts a horizontal pushing force and the second of the said paired driver units simultaneously imparts a horizontal pulling force equal to the pushing force, both of said forces being oriented to act along a common collinear horizontal direction; and a means for electrically exciting said paired dynamic force driver units in a manner which imparts either continuous or pulsed oscillatory forces to said coupling frame, said continuous or pulsed oscillatory forces being prescribed in amplitude and time dependence to produce corresponding prescribed seismic shear waves in said solid medium.

2. The transducer of claim 1 in which said coupling frame has a contact surface containing gripper teeth or spikes or fins or other similar means for penetrating substantially into said solid medium to promote intimate and uninterrupted contact with said solid medium and to achieve horizontally oriented vibrational coupling with said solid medium.

3. The transducer of claim 1 having sufficient weight to achieve firm and uninterrupted contact with said solid medium.

4. The transducer of claim 1 in which an anchoring device provides positive attachment of said coupling frame to said solid medium.

5. The transducer of claim 1 further comprising an auxiliary force generator for urging said transducer into contact with said solid medium.

6. The transducer of claim 1 in which at least one pair of said identical compliant springs supporting each said pair of dynamic force driver units is adjustable in compliance to permit said mechanical resonance associated with said pair of dynamic force drivers to be changed as a means of modifying a frequency range of seismic shear waves radiated into said solid medium.

7. The transducer of claim 1 in which at least two pairs of said dynamic force driver units mounted on said coupling frame and supported by said pairs of identical compliant springs, each combination of said pair of dynamic driver units and said pair of support springs having a mass and a compliance, respectively, which act in mechanical resonance at a prescribed frequency, said mechanical resonance frequencies of the said at least two pairs being different from one another to constitute stagger-tuned resonance operation of said dynamic force transducer.

8. The transducer of claim 1 in which said dynamic force driver units employ piezoelectric force generating elements, said elements being excited by a prescribed electrical voltage waveform to produce either continuous or pulsed dynamic forces.

9. The transducer of claim 1 in which said dynamic force driver units employ magnetostrictive force generating elements, said elements being excited by a prescribed electrical current waveform to produce either continuous or pulsed dynamic forces.

10. The transducer of claim 1 in which said dynamic force driver units employ electrodynamic members comprising a movable coil in a static radially oriented magnetic field, said magnetic field being produced within a body of each said dynamic force driver unit, and said coil carrying a prescribed time-dependent electrical current waveform to produce either continuous or pulsed dynamic forces.

11. The transducer of claim 1 in which said compliant springs supporting said reaction masses are incrementally adjustable either by hydraulic means or mechanical means to change their compliance according to a prescribed predetermined function of time so as to systematically change the mechanical resonance frequency associated with the said adjustable springs and the mass of said coupling frame in a corresponding prescribed function of time, said prescribed change in mechanical resonance frequency being synchronized to equally track said prescribed excitation signal having a continuously changing frequency, said vibrator being mechanically resonant at said time-varying excitation frequency.

12. The transducer of claim 1 in which at least two of said dynamic force drivers are mounted on an elongated coupling frame and baseplate to impart horizontally oriented dynamic forces to produce intentionally directional radiation of shear waves in said solid medium in a direction generally broadside to said elongated frame and baseplate.

13. A dynamic force transducer for generating horizontally oriented shear forces and motions at a surface of a solid medium for purposes of producing dynamic shear stresses and radiating associated horizontally polarized shear waves in said solid medium, comprising:

a rigid coupling frame in direct contact with said surface of said solid medium, said coupling frame being in uninterrupted contact with said solid medium during vibrational operation of said dynamic force transducer; and at least one electrodynamic force driver unit mounted on said coupling frame to impart horizontally oriented dynamic forces having prescribed amplitude and time dependence to said coupling frame, said electrodynamic force driver further comprising:

a horizontally oriented movable coil located axisymmetrically in a radially oriented static magnetic field produced within a body of said electrodynamic force driver unit, said coil carrying a prescribed electrical current waveform to produce either continuous or pulsed dynamic forces;

a rigid horizontally oriented shaft for transferring said generated dynamic forces to reaction masses attached to each end of said horizontally oriented shaft;

each said reaction mass being supported by at least one pair of identical compliant springs attached to said coupling frame, each of said springs having a compliance value which, when acting in combination with a mass of said body of said electrodynamic force driver unit and coupling frame, is capable of introducing predetermined mechanical resonances when excitation energy is applied to said dynamic force driver unit;

said electrodynamic force driver body capable of producing said static magnetic field radially oriented relative to an axis of said shaft and coil and rigidly mounted on said coupling frame;

said body of said force driver unit having a generally hollow cylinder surrounding said rigid horizontally oriented shaft and coil, said hollow cylinder allowing the ends of said surrounded shaft to extend out of ends of said hollow cylinder body and attached to said reaction masses to impart dynamic forces to these reaction masses, thereby causing said body of said dynamic force driver unit to experience equal and opposite dynamic forces relative those transferred to said reaction masses through electrodynamic force generation, said equal and opposite dynamic forces being transferred to said body of said dynamic force driver unit and, in turn, to said coupling frame to which said body of said force driver unit is attached.

14. The transducer of claim 13 in which said movable coil and said rigid shaft and said reaction masses attached to said rigid shaft form a unitized component of said dynamic force transducer which vibrates as a result of forces associated with a magnetic field produced by prescribed oscillatory electric current flowing in said coil in reaction with said static magnetic field in said hollow cylindrical body surrounding said coil component.

15. The transducer of claim 13 in which said body of said electrodynamic force driver unit contains a permanently magnetized ferromagnetic member producing said radially directed static magnetic field against which a magnetic field produced by time-varying current flowing in windings of said movable coil acts to generate said dynamic forces by which said transducer operates.

16. The transducer of claim 13 in which said radially oriented magnetic field is produced by a coil and ferromagnetic member in said body of said electrodynamic force driver, said coil carrying a direct current.

17. The transducer of claim 13 in which said coupling frame further comprises a contact surface having means for penetrating substantially into said solid medium.

18. A seismic shear wave vibrator source system utilizing a dynamic force transducer for generating horizontally oriented shear forces and motions at a surface of a solid medium for purposes of producing dynamic shear stresses and radiating associated horizontally polarized shear waves in said solid medium, comprising:

a rigid coupling frame in direct contact with said surface of said solid medium, said coupling frame being maintained in uninterrupted contact with said solid medium during vibrational operation of said dynamic force transducer;

at least one dynamic-force driver unit mounted on said coupling frame to impart horizontally oriented dynamic forces having prescribed amplitude and time dependence to said coupling frame, said prescribed forces transferrable to said solid medium;

at least one pair of identical compliant springs supporting the said dynamic force driver unit and its associated components mounted on said coupling frame, compliances of each said pair of springs selectable or adjustable introducing different predetermined mechanical resonances when acting in combination with the said supported driver unit and said coupling frame when excitation energy is applied to said dynamic force driver units;

a means for exciting said at least one dynamic force driver unit in a manner to produce simultaneous horizontally oriented pushing and pulling forces on said coupling frame, said pushing and pulling forces being oriented to act along a common collinear horizontal direction;

a means for electrically exciting said at least one dynamic force driver unit in a manner which imparts either continuous or pulsed oscillatory forces to said coupling frame, said continuous or pulsed oscillatory forces being prescribed in amplitude and time dependence to produce corresponding prescribed seismic shear waves in said solid medium;

a power amplifier capable of delivering electrical excitation voltage and current to said at least one dynamic force driver unit; and an electrical excitation signal generator capable of generating predetermined continuous or pulse waveforms to be applied to input terminals of said power amplifier, said continuous waveforms to be either a linear or a nonlinear frequency-modulated sinewave sweep signal having a predetermined amplitude versus frequency characteristic and frequency versus time sweep range, or said pulse waveforms to be either periodically repetitive or randomly timed bursts of a sine wave having a predetermined amplitude, frequency, and burst duration time, or said continuous or pulsed waveforms to consist of random noise signals having predetermined statistically determined amplitude, frequency, and time duration parameters.

19. The system of claim 18 in which said dynamic force transducer is operated to deliver a dynamic shear force of up to approximately 500 pounds force to said solid medium.

20. The system of claim 18 in which said dynamic force transducer is operated to produce a dynamic shear force having a useful frequency spectrum covering the range of at least 100 Hz to 1,600 Hz.

21. The system on of claim 18 in which said dynamic force transducer is operated to deliver a dynamic shear force of up to approximately 500 pounds force to said solid medium and having a useful frequency spectrum covering the range of at least 100 Hz to 1,600 Hz.

* * * * *